(12) United States Patent
Tseng et al.

(10) Patent No.: US 11,791,690 B2
(45) Date of Patent: Oct. 17, 2023

(54) MOTOR FOR ELECTRIC CYLINDER AND ENCODER FOR MOTOR

(71) Applicants: Toyo Automation Co., Ltd., Tainan (TW); Hofo Automation Co., Ltd., Taoyuan (TW)

(72) Inventors: Kun-Cheng Tseng, Tainan (TW); Hao-Wen Tseng, Tainan (TW); Yu-Li Wang, Taoyuan (TW); Po-Tsao Yang, Taoyuan (TW)

(73) Assignees: Toyo Automation Co., Ltd., Tainan (TW); Hofo Automation Co., Ltd., Taoyuan (TW)

( * ) Notice: Subject to any disclaimer, the term of this patent is extended or adjusted under 35 U.S.C. 154(b) by 0 days.

(21) Appl. No.: 17/498,871

(22) Filed: Oct. 12, 2021

(65) Prior Publication Data

US 2022/0239189 A1 Jul. 28, 2022

(30) Foreign Application Priority Data

Jan. 22, 2021 (TW) ................................. 110102567

(51) Int. Cl.
*H02K 7/06* (2006.01)
*H02K 1/28* (2006.01)
(52) U.S. Cl.
CPC ................. *H02K 7/06* (2013.01); *H02K 1/28* (2013.01)

(58) Field of Classification Search
CPC .......... H02K 7/06; H02K 1/28; H02K 11/215; H02K 7/003; H02K 29/06; F15B 15/1428; G01D 5/245
See application file for complete search history.

(56) References Cited

U.S. PATENT DOCUMENTS

| | | | |
|---|---|---|---|
| 11,101,718 B2 * | 8/2021 | Heo | H02K 11/215 |
| 2002/0171416 A1 * | 11/2002 | Schroeder | G01D 5/145 |
| | | | 324/207.21 |
| 2006/0244441 A1 * | 11/2006 | Ramsden | G01D 5/145 |
| | | | 324/207.22 |
| 2007/0131475 A1 * | 6/2007 | Matsubara | H02K 7/003 |
| | | | 180/443 |
| 2020/0083784 A1 * | 3/2020 | Fukuda | G01D 5/24442 |

\* cited by examiner

*Primary Examiner* — Bernard Rojas

(57) ABSTRACT

A motor for an electric cylinder includes a motor body, an encoder, a rotor coupling portion and an encoder fixing portion. The motor body includes a rotor having a shaft hole through which a rotating shaft extends. The encoder is installed on the motor body and includes a fixing ring fixed on the rotating shaft, a magnet holder combined with the fixing ring, an encoder magnet mounted on the magnet holder, and a magnetic sensor opposite to the encoder magnet. The magnet holder is rotatable relative to the fixing ring to adjust the magnetic pole position of the encoder magnet relative to the magnetic sensor. The rotor coupling portion is arranged on the rotor and fixed to the rotating shaft at a first corresponding position. The encoder fixing portion is arranged on the fixing ring and fixed with the rotating shaft at a second corresponding position.

5 Claims, 6 Drawing Sheets

MOTOR FOR ELECTRIC CYLINDER AND ENCODER FOR MOTOR

BACKGROUND OF THE INVENTION

1. Field of the Invention

The present invention relates to an electric cylinder and, more particularly, to a motor for an electric cylinder and an encoder for the motor.

2. Description of the Related Art

Conventional electric cylinders or slide devices are widely used in industrial machines and generally employ a motor to drive a rotating shaft (screw shaft), so that the load end can move linearly. The general electric cylinder mainly includes a linear track, a sliding unit arranged on the linear track, and a motor. The sliding unit is provided with a rotating shaft which is connected with a spindle of the motor through a coupling. When the motor drives the rotating shaft to rotate through the coupling, the sliding unit can reciprocate relative to the linear track along a longitudinal direction, so that the carrier mounted on the sliding unit will be driven to move linearly. However, in long-term use, the coupling is prone to damage or loosening. In addition, the arrangement of the coupling will cause the electric cylinder to have a longer longitudinal length and a larger volume, which cannot effectively save space to achieve the purpose of light weight.

To mitigate the above-mentioned problems caused by the use of the coupling to connect the rotating shaft, a hollow motor without a spindle is designed. The hollow motor includes a housing, a hollow rotor housed in the housing, a magnet coupled to the rotor, a stator coil, and an encoder. The rotating shaft of the electric cylinder can be directly engaged in the hollow rotor, so the use of the coupling can be omitted. When the rotor of the hollow motor rotates, the rotating shaft is driven, so that the sliding unit can reciprocate relative to the linear track along the longitudinal direction. Since the hollow motor does not have a spindle, the longitudinal length of the electric cylinder can be reduced, thereby reducing the volume of the electric cylinder. However, the completion of magnetic pole angle alignment is achieved after the hollow motor and the rotating shaft are assembled. When the components of the hollow motor are damaged or the magnets are demagnetized, the assembly step of replacing the hollow motor is quite complicated. Generally, the customer cannot replace it by himself, and the entire electric cylinder needs to be sent back to the factory for repair, which is time-consuming. Specifically, after the hollow motor and the rotating shaft are assembled, the magnetic pole phase of the rotor magnet needs to be aligned with the stator coil first. This alignment operation is generally to send power to the stator coil, so that the rotor rotates to an initial position relative to the stator coil and then stops to complete the alignment. In addition, the magnetic pole position of the encoder magnet of the encoder also needs to complete the alignment operation with the magnetic sensor of the encoder. However, in the operation of adjusting the magnetic pole position of the encoder magnet, in addition to power transmission to the stator coil, it is more necessary to manually adjust the magnetic pole position of the encoder magnet relative to the magnetic sensor, which is very tedious and time-consuming in the alignment adjustment operation.

BRIEF SUMMARY OF THE INVENTION

Thus, an objective of the present invention is to provide a motor for an electric cylinder, which is a hollow motor without a spindle and has a hollow rotor that can be connected to a rotating shaft of the electric cylinder. The design effect of the motor on the structure is to allow the manufacturer to complete the alignment of the magnetic pole phase of the rotor magnet with the stator coil in the factory, and also to complete the alignment of the magnetic pole position of the encoder magnet with the magnetic sensor of the encoder. Thus, the magnetic pole alignment problems of the rotor magnet and the encoder magnet are avoided when the motor of the electric cylinder is replaced by the customer, so that the customer can quickly, conveniently and accurately conduct motor replacement and assembly, and the competitiveness of the electric cylinder is improved.

To achieve this and other objectives, a motor according to an embodiment of the present invention is applicable to an electric cylinder including a rotating shaft which extends along a longitudinal direction and has a motor-side shaft portion provided with a shaft coupling portion and a shaft fixing portion spaced from the shaft coupling portion. The motor comprises a motor body, an encoder, a rotor coupling portion, and an encoder fixing portion. The motor body includes a housing, a rotor contained in the housing, a stator coil, a rotor magnet. The rotor has a shaft hole extending in the longitudinal direction through which the motor-side shaft portion extends. The rotor magnet is coupled to the rotor and has at least one pair of magnetic poles. The rotor is rotatable about a central axis of the rotating shaft relative to the stator coil. The encoder is installed on the motor body and includes a fixing ring, a magnet holder combined with the fixing ring, an encoder magnet, and a magnetic sensor. The motor-side shaft portion of rotating shaft extends through the fixing ring. The encoder magnet is mounted on the magnet holder and has at least one pair of magnetic poles. The magnetic sensor and the encoder magnet are spaced and opposed in the longitudinal direction. The magnet holder is rotatable relative to the fixing ring. The rotor coupling portion is provided in the rotor and aligned with the shaft coupling portion. The rotor coupling portion and the shaft coupling portion are coupled by a coupling member. The encoder fixing portion is provided in the fixing ring and aligned with the shaft fixing portion. The encoder fixing portion and the shaft fixing portion are fixed together by a fixing member.

In a preferred form, the shaft fixing portion is a first keyway provided in an outer circumference of the rotating shaft and extending in the longitudinal direction. The fixing ring has a through-hole extending in the longitudinal direction. The encoder fixing portion is a recess provided in a hole wall of the through-hole and extending in the longitudinal direction. The fixing member is a first key engaged in the keyway and the recess.

In a preferred form, the shaft coupling portion is a second keyway provided in the outer circumference of the rotating shaft and extending in the longitudinal direction. The rotor coupling portion is a groove provided in a hole wall of the shaft hole and extending in the longitudinal direction. The coupling member is a second key engaged in the second keyway and the groove.

In a preferred form, the shaft coupling portion includes two notches spaced in the longitudinal direction and opposite to each other in a circumferential direction of the rotating shaft. The rotor coupling portion includes two notches respectively located at two ends of the rotor and opposite to each other in a circumferential direction of the rotor. The two notches in the rotor respectively correspond to the two slots of the rotating shaft. The coupling member includes two sets of a combination of a fixing piece and two screws. The fixing piece abuts against one of the two slots, and the two screws extend through the fixing piece and are locked into one of the two notches of the rotor.

In a preferred form, the magnet holder includes a body portion and a positioning portion protruding outward from an inner side of the body portion. The encoder magnet is mounted on the body portion. The positioning portion is combined in the through-hole of the fixing ring. The magnet holder is fixed to the fixing ring by a positioning member extending through a positioning hole in the fixing ring and pressing against the positioning portion.

An encoder according to an embodiment of the present invention is applicable to a motor connected with a rotating shaft. The encoder is adapted for detecting rotation of the rotating shaft. The encoder comprises a fixing ring fixed on the rotating shaft, a magnet holder combined with the fixing ring, an encoder magnet, and a magnetic sensor. The encoder magnet is installed on the magnet holder and has at least one pair of magnetic poles. The magnetic sensor is spaced from and opposite to the encoder magnet in the longitudinal direction. The magnet holder is rotatable relative to the fixing ring to adjust magnetic pole positions of the encoder magnet relative to the magnetic sensor.

In a preferred form, the fixing ring has a through-hole extending in the longitudinal direction, and the rotating shaft extends through the through-hole.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
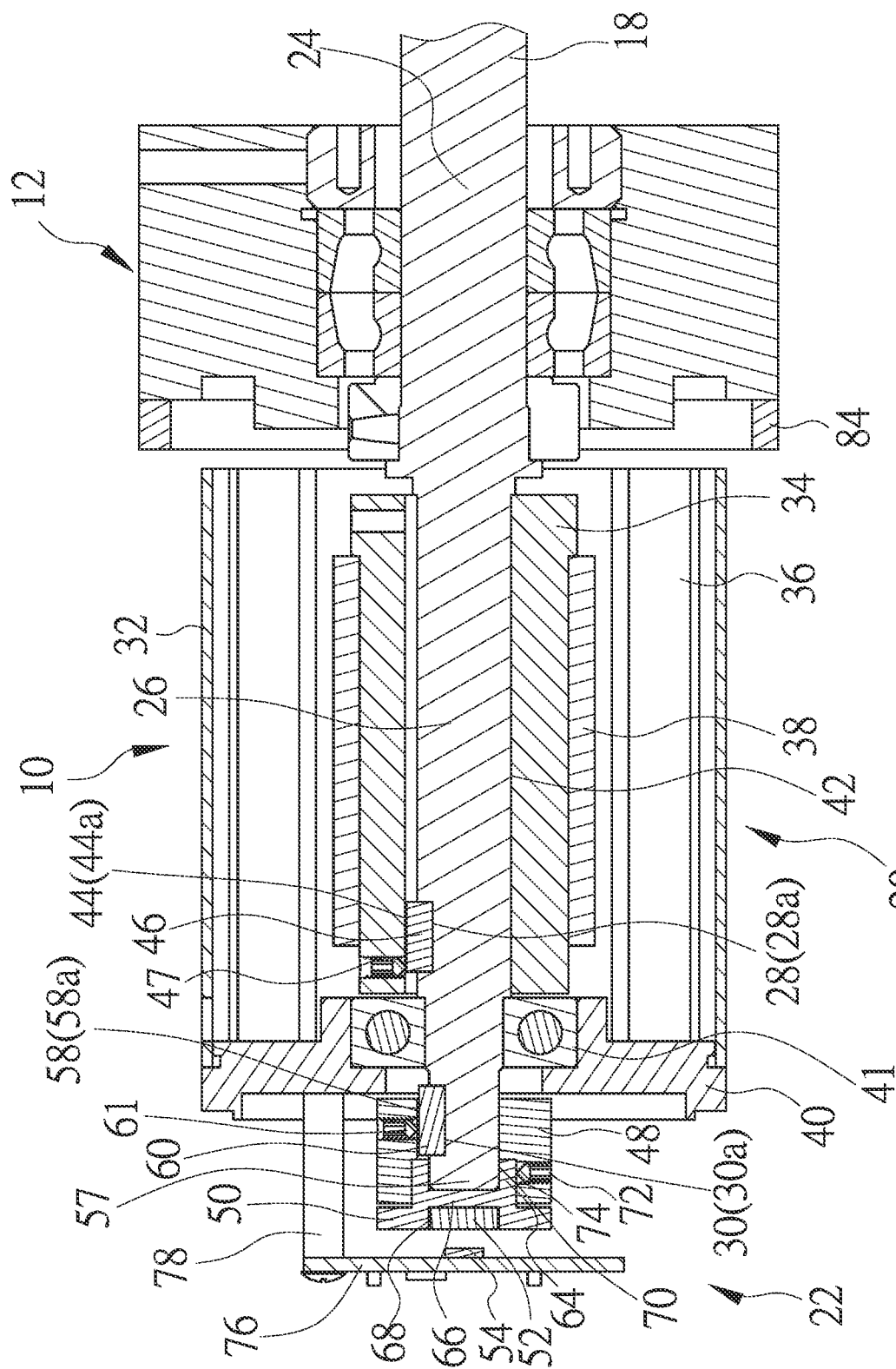
FIG. 1 is a schematic cross-sectional view of a motor in accordance with a first embodiment of the present invention applied to an electric cylinder.
Figure 2:
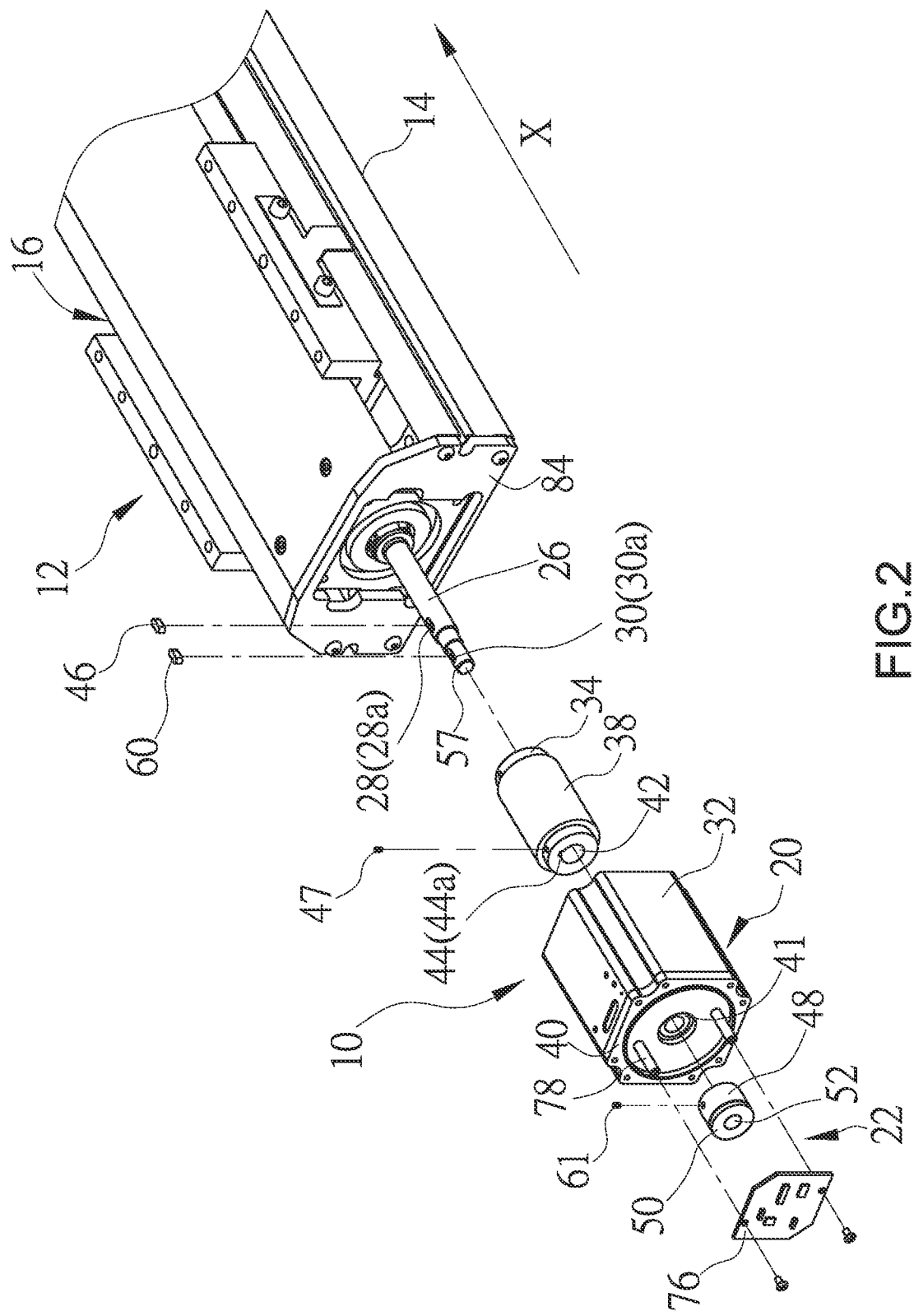
FIG. 2 shows a partially exploded view of the electric cylinder of FIG. 1.
Figure 3:
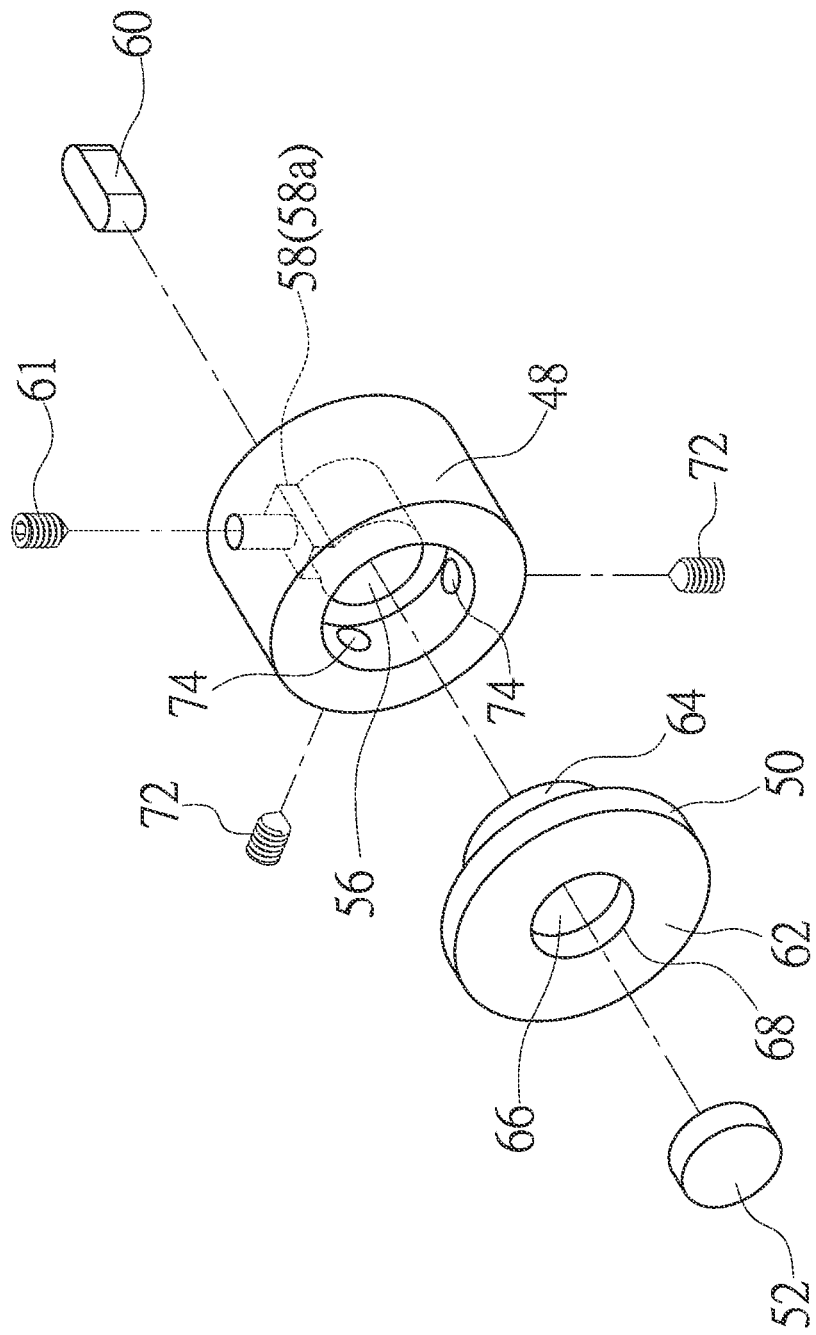
FIG. 3 shows a partially exploded view of an encoder of FIG. 1.
Figure 4:
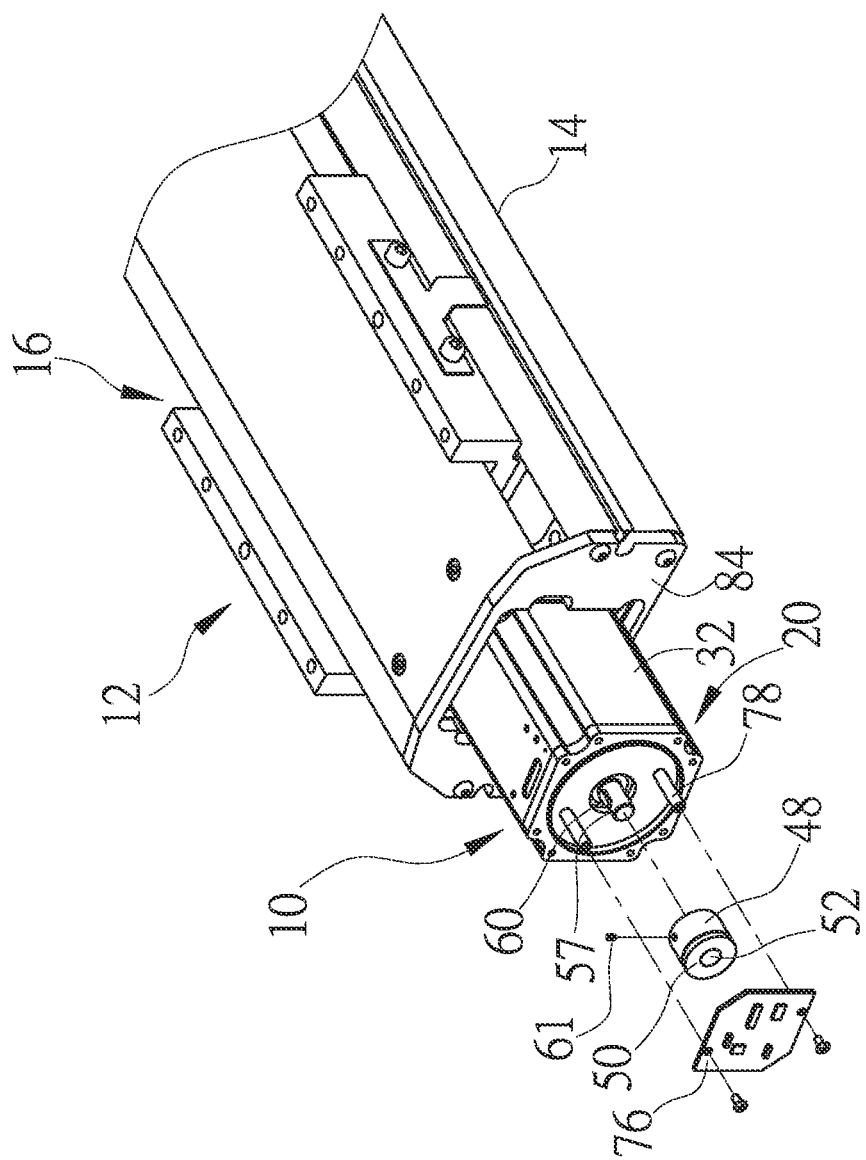
FIG. 4 shows a schematic view of assembling a motor body and a rotating shaft of FIG. 2 together.

A motor 10 according to a first embodiment of the present invention is shown in FIGS. 1 through 4 of the drawings and is applied to an electric cylinder 112. The electric cylinder 12 includes a linear track 14, a sliding unit 16, a rotating shaft 18, a motor body 20, and an encoder 22. The linear track 14 extends along a longitudinal direction (X). The sliding unit 16 is mounted on the linear track 14. The rotating shaft 18 includes a sliding-side shaft portion 24 combined with the sliding unit 16 and a motor-side shaft portion 26 combined with the motor body 20. When the motor 10 is running, the rotating shaft 18 is driven to drive the sliding unit 16 to reciprocate relative to the linear track 14 in the longitudinal direction (X). Since the structures of the linear track 14 and the sliding unit 16 are well known to those skilled in the art, they will not be described in detail here.

The motor-side shaft portion 26 extends outside the sliding unit 16 and is provided with a shaft coupling portion 28 and a shaft fixing portion 30. The shaft coupling portion 28 is located between the sliding-side shall portion 24 and the shaft fixing portion 30 in the longitudinal direction (X). In a feasible embodiment, the shaft coupling portion 28 and the shaft fixing portion 30 may be respectively constituted by at least one keyway or at least one slot. In this embodiment, the shaft fixing portion 30 is a first keyway 30a provided in an outer circumference of the rotating shaft 18, and the shaft coupling portion 28 is a second keyway 28a provided in the outer circumference of the rotating shaft 18, The two keyways 28a and 30a extend in a direction parallel to the central axis of the rotating shaft 18 and are aligned in the longitudinal direction, that is, the keyways 28a, 30a have no angular offset in the circumference direction of the rotating shaft 18. In a feasible embodiment, the keyways 28a, 30a are offset by an angle (for example, 90 or 180 degrees) about the rotating shaft 18. However, the keyways 28a, 30a are preferably arranged to be aligned in the longitudinal direction, which is advantageous for making the shaft coupling portion 28 and the shaft fixing portion 30 on the rotating shaft 18.

The motor 10 of the present invention includes the motor body 20 and the encoder 22. The motor body 20 includes a housing 32, a rotor 34 received in the housing 32, a stator coil 36, a rotor magnet 38 coupled to the rotor 34, and a rear cover 40. A bearing 41 is provided on an inner periphery of the rear cover 40. The rotor 34 has a shaft hole 42 extending in the longitudinal direction through which the motor-side shaft portion 26 extends. The rotor 34 is provided with a rotor coupling portion 44. In a feasible embodiment, the rotor coupling portion 44 is formed by at least one groove or at least one recess. In this embodiment, the rotor coupling portion 44 is a groove 44a provided in the hole wall of the shaft hole 42 and extending in the longitudinal direction. By aligning the rotor coupling portion 44 with the shaft coupling portion 28 and inserting a coupling member 46 such as a key (second key) into the shaft coupling portion 28 (second keyway 28a) and the rotor coupling portion 44 (groove 44a) to form a limit, the rotor coupling portion 44 will be combined and fixed with the shaft coupling portion 28, so that the rotor 34 and the rotating shaft 18 can rotate together about the central axis of the rotating shaft 18. In addition, a limiting member 47 such as a set screw extends through the rotor 34 and abuts against the coupling member 46 to limit the movement of the rotor 34 relative to the rotating shaft 18 in the longitudinal direction. The stator coil 36 is coupled to an inner peripheral wall of the housing 32. The rotor magnet 38 is combined with the outer periphery of the rotor 34 and has a plurality of pairs of magnetic poles (N pole and S pole). When the stator coil 36 is energized, the rotor 34 and the rotating shaft 18 together rotate an angle relative to the stator coil 36.

The encoder 22 is installed on the motor body 20 to detect the rotation number, rotation direction, and rotation angle of the rotating shaft 18. The encoder 22 includes a fixing ring 48, a magnet holder 50, an encoder magnet 52 and a magnetic sensor 54. In this embodiment, the fixing ring 48 has a through-hole 56 extending in the longitudinal direction through which an outer end 57 of the motor-side shaft portion 26 extends. The outer end 57 has a smaller outer diameter and extends out of the housing 32 of the motor body 20, and the shaft fixing portion 30 is provided in the outer end 57. At least one encoder fixing portion 58 is provided in the fixing ring 48. In a feasible embodiment, the encoder fixing portion 58 is formed by at least one groove or at least one recess. In this embodiment, the encoder fixing portion 58 is a recess 58a provided in the hole wall of the through-hole 56 and extending in the longitudinal direction. By aligning the encoder fixing portion 58 with the shaft fixing portion 30 and inserting a fixing member 60 such as a key (first key) into the shaft fixing portion 30 (first keyway 30a) and the encoder fixing portion 58 (recess 58a) to form a limit, the encoder fixing portion 58 can be combined and fixed with the shaft fixing portion 30, so that the encoder magnet 52 and the rotating shaft 18 can rotate together about the central axis of the rotating shaft 18. In addition, a limiting member 61 such as a set screw passes through the fixing ring 48 and abuts against the fixing member 60 to restrict the movement of the fixing ring 48 relative to the rotating shaft 18 in the longitudinal direction.

The magnet holder 50 is rotatably combined with the fixing ring 48. In this embodiment, the magnet holder 50 includes a body portion 62, a positioning portion 64 protruding outward from an inner side of the body portion 62, and an abutting portion 66 located between the body portion 62 and the positioning portion 64. The body portion 62 and the positioning portion 64 are respectively provided with first and second recesses 68 and 70 separated by the abutting portion 66. The encoder magnet 52 is installed in the first recess 68 of the main body 62. The positioning portion 64 is inserted into the through-hole 56 of the fixing ring 48, and the outer end 57 of the motor-side shaft portion 26 is inserted into the second recess 70 and abuts against the abutting portion 66. In this embodiment, a positioning member 72 such as a set screw passes through a positioning hole 74 provided in the fixing ring 48 and abuts against the positioning portion 64, so that the magnet holder 50 can be fixed to the fixing ring 48. When the positioning member 72 is loosened, the magnet holder 50 can be rotated relative to the fixing ring 48 to adjust the magnetic pole position of the encoder magnet 52. In this embodiment, the magnetic sensor 54 is mounted on a circuit board 76 which is fixed to the rear cover 40 of the motor body 20 through two supporting posts 78. The magnetic sensor 54 and the encoder magnet 52 are spaced and opposed in the longitudinal direction. When the encoder magnet 52 rotates, the magnetic sensor 54 can sense the encoder magnet 52. When the magnet holder 50 rotates an angle relative to the fixing ring 48, the magnetic pole position of the encoder magnet 52 relative to the magnetic sensor 54 will be adjusted.

With regard to the assembly of the motor 10 and the rotating shaft 18 of the present invention, the motor-side shaft portion 26 first extends through the shaft hole 42 of the rotor 34, and the shaft coupling portion 28 of the rotating shaft 18 is aligned with the rotor coupling portion 44 of the rotor 34. The rotor coupling portion 44 and the shaft coupling portion 28 are coupled by the coupling member 46, so that a first corresponding position between the rotor 34 and the rotating shaft 18 is fixed. Next, the housing 32 containing the stator coil 36 is installed around the outer circumference of the rotor 34 and fixed to an end cover 84 of the electric cylinder 12 (see FIG. 4). Then, the fixing ring 48 combined with the magnet holder 50 is installed on the motor-side shaft portion 26, and the encoder fixing portion 58 is aligned with the shaft fixing portion 30. The encoder fixing portion 58 and the shaft fixing portion 30 are combined by the fixing member 60, so that a second corresponding position between the fixing ring 48 and the rotating shaft 18 is fixed. Finally, the circuit board 76 of the encoder 22 is mounted on the motor housing 32 by the support posts 78.

After the motor 10 and the rotating shaft 18 are assembled, a power supply can be sent to the stator coil 36 to make the rotor 34 relative to the stator coil 36 rotate to a position and then stop to complete the alignment of the magnetic pole phase of the rotor magnet 38 with the stator coil 36. Next, the magnet holder 50 is rotated to adjust the position of the magnet holder 50 relative to the fixing ring 48 such that the magnetic pole position of the encoder magnet 52 is aligned with the magnetic sensor 54. Then, the magnet holder 50 is fixedly combined with the fixing ring 48 by the positioning member 72, so that the magnetic pole position of the encoder magnet 52 relative to the magnetic sensor 54 will not change. After the motor 10 assembled on the rotating shaft 18 completes the alignment procedure described above, the motor 10 can be operated to drive the rotating shaft 18 of the electric cylinder 12 to rotate, and the encoder 22 can detect the rotation of the rotating shaft 18.

The structure of the motor 10 of the present invention has an advanced feature that is not available in the prior art. This feature allows manufacturers with assembly expertise to first complete the alignment of the magnetic pole phase of the rotor magnet 38 with the stator coil 36 in the factory, and also complete the alignment of the magnetic pole position of the encoder magnet 52 with the magnetic sensor 54 of the encoder 22, so that the customers can quickly and easily complete the replacement of the motor 10, without the need to send the entire electric cylinder back to the factory for repair. Specifically, after the motor 10 that has completed the magnetic pole position alignment procedure is detached from the rotating shaft 18, if the rotor 34 of the motor 10 is then assembled on another rotating shaft 18 according to the first corresponding position between the rotor 34 and the rotating shaft 18 with the encoder 22 of the motor 10 assembled on the another rotating shaft 18 according to the second corresponding position between the fixing ring 48 and the rotating shaft 18, the magnetic pole phase of the rotor magnet 38 and the magnetic pole position of the encoder magnet 52 will not be changed. Accordingly, when the customer needs to replace the motor 10 because the motor 10 is damaged or the magnet is demagnetized, the manufacturer can provide the motor 10 that has completed the alignment procedure in the factory to the customer. Then, the customer only needs to connect the rotor coupling portion 44 (groove 44a) of the rotor 34 of the motor 10 with the shaft coupling portion 28 (second keyway 28a) of the rotating shaft 18 at the customer side by the coupling member (second key) 46, and to connect the encoder fixing portion 58 (the recess 58a) of the fixing ring 48 with the shaft fixing portion 30 (first keyway 30a) of the rotating shaft 18 by the fixing member (first key) 60, so that the replacement of the motor 10 can be completed without the magnetic pole alignment problems of the rotor magnet 38 and the encoder magnet 52 on the customer side.

Figure 5:
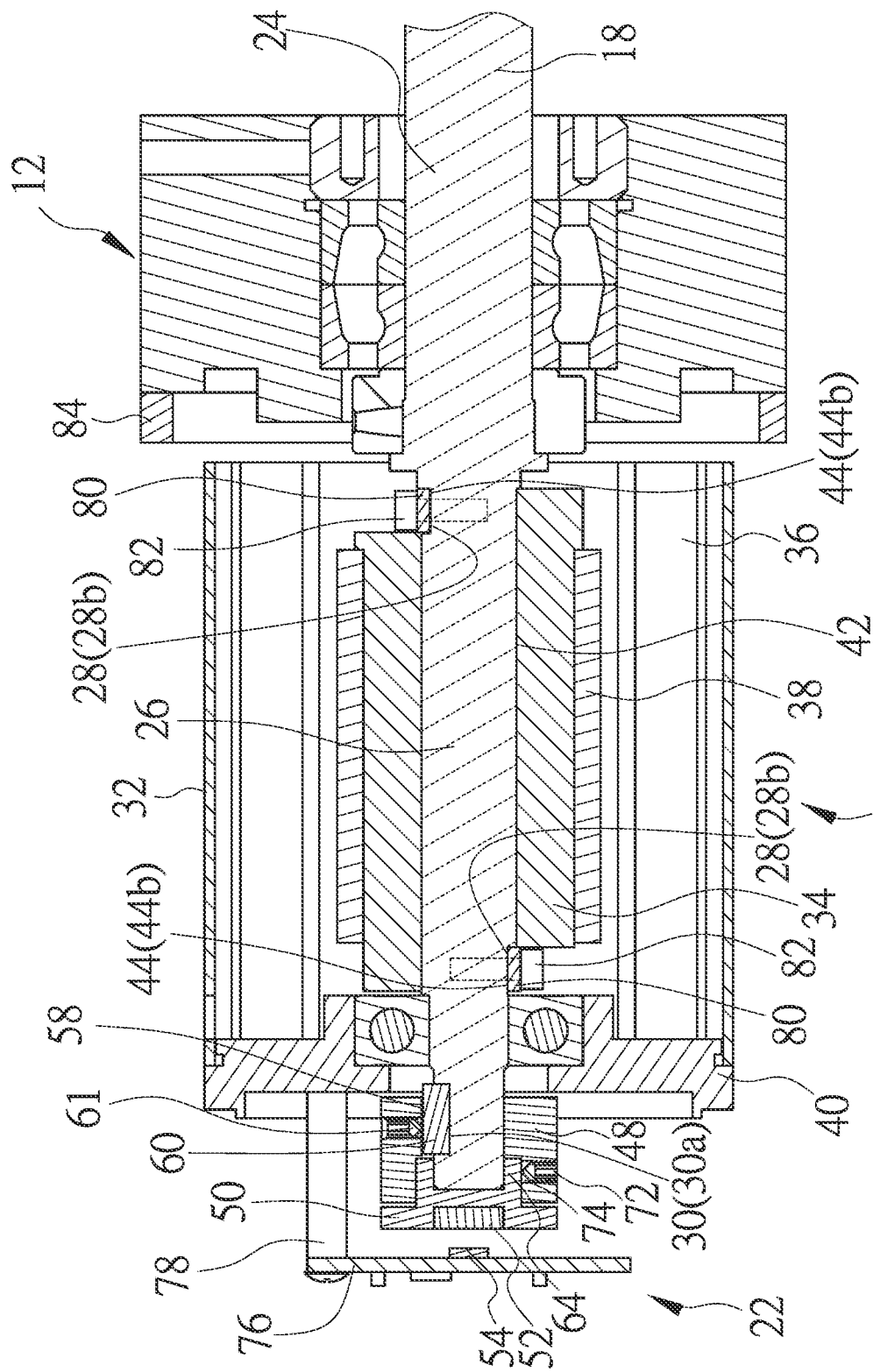
FIG. 5 is a schematic cross-sectional view of a motor in accordance with a second embodiment of the present invention applied to an electric cylinder.
Figure 6:
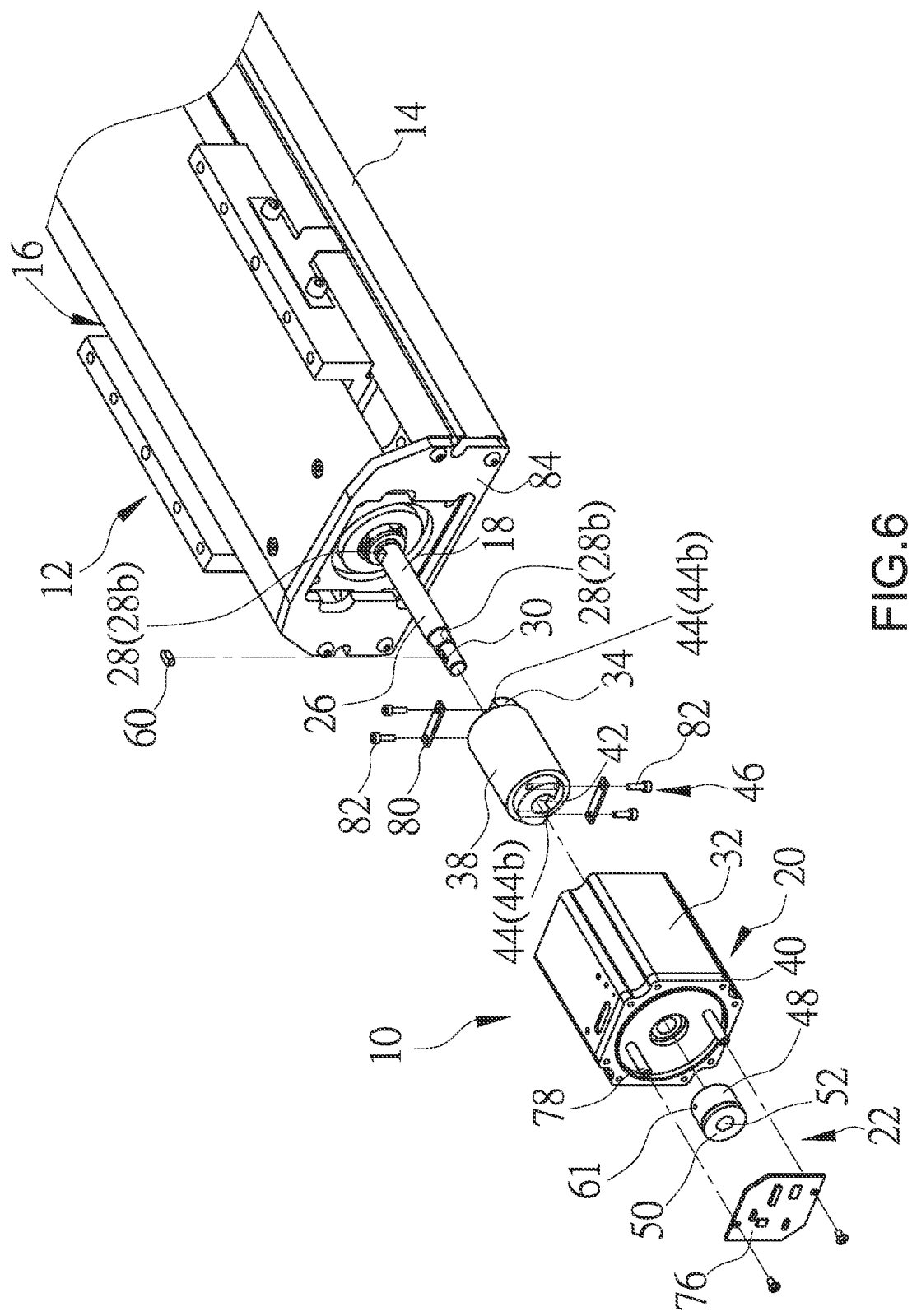
FIG. 6 shows a partially exploded view of the electric cylinder of FIG. 5.

FIG. 5 and FIG. 6 show a motor 10 according to a second embodiment of the present invention. In this embodiment, the shaft coupling portion 28 on the motor-side shaft portion 26 includes two slots 28b spaced in the longitudinal direction and opposite in the circumferential direction of the rotating shaft 18. The rotor coupling portion 44 on the rotor 34 includes two notches 44b respectively located at two ends of the rotor 34 and opposite to each other in the circumferential direction of the rotor 34. The coupling member 46 includes two sets of a combination of a fixing piece 80 and two screws 82. After the motor-side shaft portion 26 passes through the shaft hole 42 of the rotor 34, the notches 44b of the rotor 34 can respectively correspond to the slots 28b of the motor-side shaft portion 26. Then the two fixing pieces 80 are used to abut against the two slots 28b (shaft coupling portion 28) respectively, and the screws 82 extend through the fixing piece 80 and are locked into the two notches 44b (rotor coupling portion 44) of the rotor 34 to combine the motor-side shaft portion 26 and the rotor 34. Thus, the rotor 34 and the rotating shaft 18 can rotate together about the central axis of the rotating shaft 18, and the movement of the rotor 34 relative to the rotating shaft 18 in the longitudinal direction can be restricted. In this embodiment, the shaft fixing portion 30, the encoder fixing portion 58, and the fixing member 60 have the same structure as the shaft fixing portion 30, the encoder fixing portion 58 and the fixing member 60 in the first embodiment, wherein the first keyway 30a constituting the shaft fixing portion 30 and the two slots 28b constituting the shaft coupling portion 28 have a preset relative positional relationship, for example, the first keyway 30a and one of the slots 28b are aligned in the longitudinal direction. It should be noted that the shaft fixing portion 30, the encoder fixing portion 58 and the fixing member 60 in this embodiment can also be configured to have the same structure as the shaft coupling portion 28, the rotor coupling portion 44 and the coupling member 46 in this embodiment.

The scope of the invention is to be indicated by the appended claims, rather than by the foregoing description, and all changes which come within the meaning and range of equivalency of the claims are intended to be embraced therein.

REFERENCE SIGNS LIST

| | |
|---|---|
| 10 motor | 12 electric cylinder |
| 14 linear track | 16 sliding unit |
| 18 rotating shaft | 20 motor body |
| 22 encoder | 24 sliding-side shaft portion |
| 26 motor-side shaft portion | 28 shaft coupling portion |
| 28a second keyway | 28b slot |
| 30 shaft fixing portion | 30a first keyway |
| 32 housing | 34 rotor |
| 36 stator coil | 38 rotor magnet |
| 40 rear cover | 41 bearing |
| 42 shaft hole | 44 rotor coupling portion |
| 44a groove | 44b notch |
| 46 coupling member | 47 limiting member |
| 48 fixing ring | 50 magnet holder |
| 52 encoder magnet | 54 magnetic sensor |
| 56 through-hole | 57 outer end |
| 58 encoder fixing portion | 58a recess |
| 60 fixing member | 61 limiting member |
| 62 body portion | 64 positioning portion |
| 66 abutting portion | 68 first recess |
| 70 second recess | 72 positioning member |
| 74 positioning hole | 76 circuit board |
| 78 supporting post | 80 fixing piece |
| 82 screw | 84 end cover |

The invention claimed is:

1. A motor for an electric cylinder, the electric cylinder including a rotating shaft which extends along a longitudinal direction and has a motor-side shaft portion provided with a shaft coupling portion and a shaft fixing portion spaced from the shaft coupling portion, the motor comprising:
a motor body including a housing, a rotor received in the housing, a stator coil, and a rotor magnet, with the rotor having a shaft hole extending in the longitudinal direction through which the motor-side shaft portion extends, with the rotor magnet coupled to the rotor and having at least one pair of magnetic poles, wherein the rotor is rotatable about a central axis of the rotating shaft relative to the stator coil;
an encoder installed on the motor body and including a fixing ring, a magnet holder combined with the fixing ring, an encoder magnet, and a magnetic sensor, with the motor-side shaft portion of rotating shaft extending through the fixing ring, with the encoder magnet mounted on the magnet holder and having at least one pair of magnetic poles, with the magnetic sensor and the encoder magnet spaced and opposed in the longitudinal direction;
a rotor coupling portion provided in the rotor and aligned with the shaft coupling portion, with the rotor coupling portion and the shaft coupling portion coupled by a coupling member; and
an encoder fixing portion provided in the fixing ring and aligned with the shaft fixing portion, with the encoder fixing portion and the shaft fixing portion fixed by a fixing member,
wherein the fixing ring has a through-hole extending in the longitudinal direction, with the magnet holder including a body portion and a positioning portion protruding outward from an inner side of the body portion, with the encoder magnet mounted on the body portion, with the positioning portion combined in the through-hole of the fixing ring, wherein the magnet holder is fixed to the fixing ring by a positioning member extending through a positioning hole in the fixing ring and pressing against the positioning portion.

2. The motor as claimed in claim 1, wherein the shaft fixing portion is a first keyway provided in an outer circumference of the rotating shaft and extending in the longitudinal direction, with the encoder fixing portion being a recess provided in a hole wall of the through-hole and extending in the longitudinal direction, with the fixing member being a first key engaged in the first keyway and the recess.

3. The motor as claimed in claim 2, wherein the shaft coupling portion is a second keyway provided in the outer circumference of the rotating shaft and extending in the longitudinal direction, with the rotor coupling portion being a groove provided in a hole wall of the shaft hole and extending in the longitudinal direction, with the coupling member being a second key engaged in the second keyway and the groove.

4. The motor as claimed in claim 1, wherein the shaft coupling portion includes two slots spaced in the longitudinal direction and opposite in a circumferential direction of the rotating shaft, with the rotor coupling portion including two notches respectively located at two ends of the rotor and opposite in a circumferential direction of the rotor, with the two notches of the rotor respectively corresponding to the two slots of the rotating shaft, with the coupling member including two sets of a combination of a fixing piece and two screws, wherein the fixing piece abuts against one of the two slots, and the two screws extend through the fixing piece and are locked into one of the two notches of the rotor.

5. An encoder for a motor, the motor connected with a rotating shaft and the encoder adapted for detecting rotation of the rotating shaft, the encoder comprising:
a fixing ring fixed on the rotating shaft;
a magnet holder combined with the fixing ring;
an encoder magnet installed on the magnet holder and having at least one pair of magnetic poles; and
a magnetic sensor spaced from and opposite to the encoder magnet in a longitudinal direction,
wherein the fixing ring has a through-hole extending in the longitudinal direction, and the rotating shaft extends through the through-hole, with the magnet holder including a body portion and a positioning portion protruding outward from an inner side of the body portion, with the encoder magnet mounted on the body portion, with the positioning portion combined in the through-hole of the fixing ring, wherein the magnet holder is fixed to the fixing ring by a positioning member extending through a positioning hole in the fixing ring and pressing against the positioning portion.

* * * * *